Patented Feb. 4, 1947

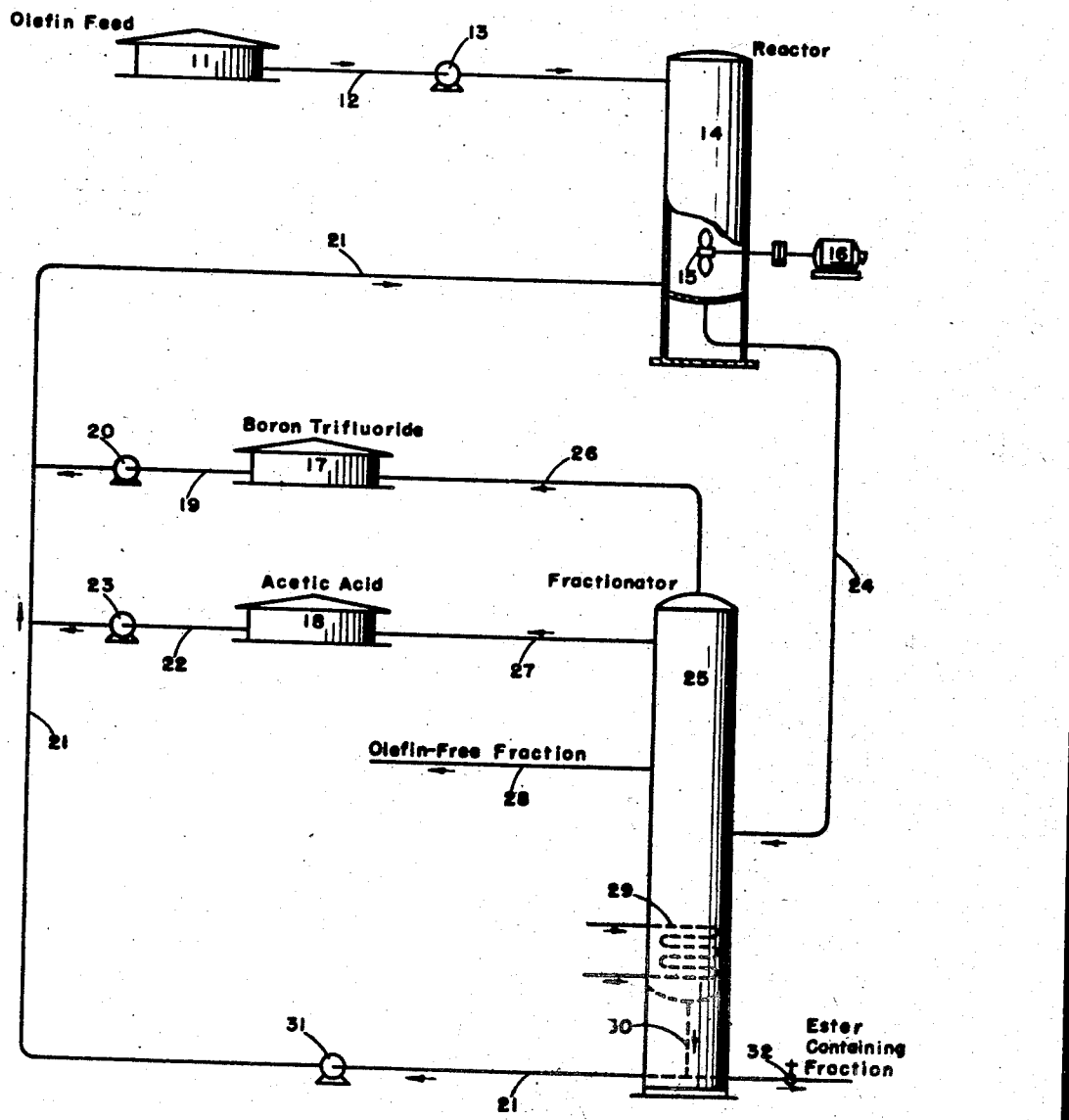

2,415,171

UNITED STATES PATENT OFFICE 2,415,171

METHOD FOR RECOVERING A SUBSTANTIALLY OLEFIN - FREE HYDROCARBON FRACTION

Joseph T. Horeczy, Baytown, Tex., assignor to Standard Oil Development Company, a corporation of Delaware Application December 1, 1943, Serial No. 512,494

6 Claims. (Cl. 196—39)

The present invention is concerned with a method for treating olefinic hydrocarbon fractions. More particularly, it relates to a method for removing olefins from olefin-containing hydrocarbons by treatment of such fractions with organic acids in the presence of boron halide catalysts whereby the olefinic hydrocarbons are converted to the corresponding esters and the non-olefinic hydrocarbons are recoverable in purified form.

In many refinery operations the removal of olefins from hydrocarbon fractions is accomplished by treating the olefin-containing fraction with strong sulfuric acid. This method is commonly referred to as acid treating, and while it is effective in reducing the olefin content of the hydrocarbon fraction in question and has received wide adoption by the industry, this method of treating results in consumption of large quantities of sulfuric acid and the formation of troublesome amounts of acid sludge. The olefins are substantially lost in the acid sludge and the acid sludge itself presents a handling problem to the petroleum refiner.

In the present invention the olefinic hydrocarbons normally lost when acid treating was employed in their removal from other hydrocarbons, are made available and recovered as organic esters of the acid used and the hydrocarbon involved. These esters have valuable properties as solvents and find wide usage in the arts. Furthermore, the unreacted hydrocarbons are then recoverable substantially free of olefins by simple distillation methods.

Briefly the present invention involves the reaction of olefinic hydrocarbons, dissolved in a suitable solvent, with organic acids in the presence of a boron halide. Acids which have been found suitable for carrying out the present invention are acetic acid and acids of the same homologous series, such as formic, propionic and butyric. In addition other organic acids, such as benzoic, salicylic and toluic may also be used. As a specific example, acetic acid may be used as the organic acid and boron trifluoride as the boron halide.

Prior investigators of the reaction between olefins and organic acids in the presence of boron trifluoride were unsuccessful in obtaining substantial yields of esterified products unless exceptionally long contact times were employed of the order of about 55 to 72 hours. The prior investigators found that when boron trifluoride in excess of about 10% was used to catalyze the reaction, the quantity of residual heavy material other than the esters increased directly with the amount of catalyst employed. Furthermore, it was found that a considerable amount of the boron trifluoride was disssolved in the ester as it was formed, and the boron trifluoride was thereby made inactive by absorption in the ester which resulted in the yield of ester remaining constant for the particular percentage of boron trifluoride employed.

The early workers employing the reaction between olefins and organic acids in the presence of boron trifluoride investigated the use of the organic acid dissolved in a solvent. It was their finding that selection of an appropriate solvent required much study. Most of the common oxygenated solvents were impractical to use in the reaction since stable compounds often resulted. Chlorinated hydrocarbons were effective to some extent but the results obtained indicated that polymerization of the olefins was promoted rather than esterification of the organic acid. To the present inventor's knowledge, a suitable solvent for the reaction was not disclosed in the prior art teachings.

In the present invention the disadvantages inherent in the prior teachings have been largely overcome. This beneficial result is attained by conducting the reaction in the presence of a hydrocarbon diluent, which for convenience may be the olefin-containing fraction itself since the olefins are obtained normally in association with other hydrocarbons such as the paraffins naphthenes and aromatics. Thus a hydrocarbon fraction containing the olefins having six carbon atoms in the molecule would also contain the corresponding paraffins, naphthenes and aromatics which compounds serve as admirable diluents for the reaction.

It has been found that high yields of esters may be obtained in accordance with the present invention when operating with the olefins in diluted form in a hydrocarbon fraction. It is also possible to recover substantially pure hydrocarbons uncontaminated with olefins by reacting the olefins with organic acids in the presence of boron trifluoride, as will be described further by reference to the attached drawing in which the single figure is a flow diagram of one method of conducting the invention.

Referring now to the drawing, numeral 11 designates a storage tank for a hydrocarbon fraction containing olefins such as a hexane-hexylene fraction. Storage tank 11 is connected by way of line 12 and pump 13 with reactor 14. Reactor 14 is provided with a stirring device 15 which is actuated by prime mover 16. The olefin-containing hydrocarbon is introduced into a reactor 14 from storage tank 11 in the manner described and is admixed therein with a complex of boron trifluoride and acetic acid. The boron trifluoride is conducted to the reactor from the storage tank 17 via line 19, pump 20, and line 21. Acetic acid is withdrawn from tank 18 through line 22 by pump 23 and injected into line 21 and thence to the reactor. Storage tank 17 is provided with line 19 and pump 20 connecting to line 21, while storage tank 18 is connected to line 21 by line 22 and pump 23.

The admixture of boron trifluoride-acetic acid complex and hydrocarbons is intimately contacted in reactor 14 for a time and at a temperature such that a homogeneous phase results. Usually two hours contact time at a temperature between about 160° and 180° F. is sufficient for complete reaction, but contact times up to about five hours may be employed. Under these conditions one phase results which is removed from the reactor 14 by line 24 for further treatment, as will be described hereinafter. The ratio of boron fluoride to acetic acid will vary widely depending on the olefin content of the hydrocarbon fraction and the number of carbon atoms in the olefin, but generally a mole ratio from about 1:2 to 1:10 may be employed. A ratio of boron trifluoride to acetic acid of 1:2 has been found to give good results.

It is desirable that the olefin-containing hydrocarbon should be added to the reactor 14 throughout the period of contact to insure formation of the esters rather than polymerization of the olefins. An excess of the organic acid over the hydrocarbon is required for best results. It is preferred to maintain a ratio of organic acid to hydrocarbon of the order of about 3:1 to about 5:1.

The reactant mixture is discharged from reactor 14 by line 24 and is introduced thereby into fractionator 25. While in this particular instance fractionator 25 has been shown as a single distillation tower, it is to be understood that it may comprise several distillation towers as desired. In the present instance fractionator 25 is equipped with line 26 for removal of gaseous boron trifluoride, line 27 for removal of unreacted acetic acid and line 28 for recovery of olefin-free hydrocarbon. Fractionator 25 is also provided with heating means 29 for adjustment of temperature and pressure conditions therein and with line 30 for discharge of residual boron trifluoride-acetic acid complex, esters, and polymers or any alkylated materials which may form.

The boron trifluoride removed from fractionator 25 by line 26 returns to storage tank 17 for reuse while the unreacted acetic acid returns by way of line 27 to storage tank 18.

Connected to line 30 is line 21 provided with pump 31 for recycle of heavy material and boron trifluoride-acetic acid complex to reactor 14. Line 30 is provided with valve 32 by way of which build-up of heavy material in the system is avoided by periodically discharging a portion of the heavy hydrocarbons formed during the reaction. This fraction contains the esters which may be recovered therefrom by further treatment such as by distillation.

It may be mentioned at this point that recycling of the heavy material formed in the reaction to the reactor 14 is beneficial since it has been found that by continually recycling a portion of the heavy hydrocarbons, formation of additional amounts of these heavy hydrocarbons is substantially suppressed.

While the stream removed from fractionator 25 by line 30 may be recycled to reactor 14 through line 21, it may be more desirable to withdraw this stream from the system by opening valve 32 and subject it to distillation conditions for recovery of the esters and then to recycle the ester-free heavy material to reactor 14 to suppress formation of additional amounts of heavy hydrocarbons. This extra distillation step on the esterified fraction is not shown in the drawing, but the invention is not necessarily limited to the particular embodiment described therein.

The present invention may be practiced with a variety of olefin-containing feed stocks. For example, it may be employed with a feed stock containing the butylenes, pentylenes, hexylenes and the like, while it may be used to remove olefins from toluene concentrates. The present invention has particular utility in reducing the olefin content of catalytically cracked naphthas whereby the isoparaffins contained therein are easily recoverable by distillation.

The amount of olefins contained in a particular fraction to be treated in accordance with the present invention should not exceed about 75%. In cases where fractions are employed which contain more than this amount of olefins it is within the spirit and scope of the present invention to dilute the olefinic content of the hydrocarbon fraction by addition of a non-olefin hydrocarbon such as a paraffin, an aromatic or a naphthene. Of course, when the olefin content of the hydrocarbon fraction is diluted by addition of an extraneous hydrocarbon, it is desirable to employ a hydrocarbon having a boiling point dissimilar to the hydrocarbon to be treated to make the extraneous hydrocarbon diluent easily recoverable from the reactants by distillation.

The present invention will be further described by reference to the following examples.

*Example 1.*—A hydrocarbon fraction boiling between 140° and 168° F. in the amount of 125 volumes was contacted with a complex of boron fluoride and acetic acid, one mole of the hydrocarbon fraction being contacted with 1½ moles of boron fluoride in 3 moles of acetic acid. The fraction having the above boiling point characteristics contained 60 weight per cent of olefins and 40 weight per cent of paraffins and naphthenes. This fraction was added over a period of two hours to the well-stirred complex with the reaction mixture being maintained at a temperature between 160° and 180° F. throughout the reaction. After the two-hour reaction period the reacting mixture comprised a homogeneous phase. The reactants were cooled to room temperature, and the mixture was washed with dilute sodium carbonate solution; the resulting hydrocarbon layer was then separated from the carbonate solution and distilled. The hydrocarbon layer before distillation amounted to 100 volumes of oily product. On distillation of the hydrocarbon layer there were recovered 30 volumes of unreacted hydrocarbons, 50 volumes of esters, and 20 volumes of polymers. The theoretical yield of esters was 120 volume per cent, while 70 per cent of the theoretical was obtained in this run. 75 per cent of the saturated hydrocarbon content were recovered, indicating that a portion of the saturates reacted with a portion of the olefinic content of the charge to form part of the material described as polymers in this run.

The yield of esters obtained in this run was greatly in excess of that obtainable when operating in accordance with the prior art.

Example 2.—In another operation a hydrocarbon fraction boiling between 200 and 250° F. which contained 30 per cent olefins, 35 per cent toluene and 35 per cent of paraffins and naphthenes, was treated with boron fluoride-acetic acid complex as described in Example 1. After the reaction time of two hours had been completed the homogeneous product was washed with sodium carbonate and the oily hydrocarbon layer separated and recovered. The yield of the hydrocarbon layer amounted to 100 volumes. Analysis of the recovered hydrocarbon layer by precise fractional distillation showed that 63 per cent by volume of the hydrocarbons, 18 per cent by volume of esters, and 19 per cent by volume of polymers were obtained. The yield of hydrocarbons based on the original non-olefin hydrocarbon content of the fraction charged showed that 90 per cent of the theoretical amount of material were recovered and that 95½ per cent of the toluene contained in the original fraction were recovered substantially free of olefins. The theoretical yield of esters obtainable if the reaction had proceeded without formation of polymerized or condensed products was 120 volume per cent. The yield of esters actually obtained was 50 per cent of the theoretical.

The above operations indicate that fractions substantially free of olefins may be obtained by proceeding in accordance with the present invention while recovering larger yields of esters than were possible heretofore when operating with contact times of the order employed in the present runs.

The nature and objects of the present invention having been described and illustrated, what I wish to claim as new and useful and to secure by Letters Patent is:

1. A method for recovering a substantially olefin-free hydrocarbon fraction comprising the steps of contacting a hydrocarbon feed stock including olefin in an amount no greater than 75% with a complex of a boron halide and an organic acid selected from the group consisting of alkyl and aryl mono-carboxylic acids at a temperature in the range of approximately 160° F. to 180° F. while maintaining a ratio of from 3 to 5 moles of acid per mole of feed stock to form a homogeneous phase, withdrawing the homogeneous phase and subjecting it to distillation conditions to recover a hydrocarbon fraction substantially free from olefins.

2. A process in accordance with claim 1 in which the feed stock boils within the range of 140° to 168° F. and contains 60% olefins and 40% paraffins and naphthenes.

3. A process in accordance with claim 1 in which the feed stock boils in the range of 200° to 250° F. and contains 30% olefins, 35% toluene and 30% paraffins and naphthenes.

4. A method for recovering a substantially olefin-free hydrocarbon fraction comprising the steps of contacting a hydrocarbon feed stock comprising olefin in an amount not in excess of 75% with a complex of acetic acid and boron trifluoride at a temperature in the range of 160° to 180° F., while maintaining a ratio of from 3 to 5 moles of acetic acid per mole of hydrocarbon feed stock to form a homogeneous phase, withdrawing the homogeneous phase from the contacting step and subjecting it to distillation conditions to recover a hydrocarbon fraction substantially free from olefins.

5. A method in accordance with claim 4 in which the complex consists of one mole of boron trifluoride per two moles of acetic acid and the hydrocarbon feed stock boils in the range of 140° to 168° F. and contains approximately 60% olefins and 40% paraffins and naphthenes.

6. A method in accordance with claim 4 in which the complex is composed of one mole of boron trifluoride per two moles of acetic acid and the feed stock boils within the range of 200° to 250° F. and contains approximately 30% olefins, 35% toluene and 35% paraffins and naphthenes.

JOSEPH T. HORECZY.

REFERENCES CITED

The following references are of record in the file of this patent:

UNITED STATES PATENTS

| Number | Name | Date |
|---|---|---|
| 2,065,540 | Schneider | Dec. 29, 1936 |
| 2,006,734 | Edlund et al. | July 2, 1935 |
| 1,365,052 | Ellis et al. | Jan. 11, 1921 |
| 1,790,521 | Davis et al. | Jan. 27, 1931 |
| 2,356,357 | Schlesman et al. | Aug. 22, 1944 |
| 2,133,452 | Hewlett | Oct. 18, 1938 |